(12) United States Patent
Edwards et al.

(10) Patent No.: US 11,368,544 B2
(45) Date of Patent: Jun. 21, 2022

(54) SCALABLE SERVER-BASED WEB SCRIPTING WITH USER INPUT

(71) Applicant: Capital One Services, LLC, McLean, VA (US)

(72) Inventors: Joshua Edwards, Philadelphia, PA (US); Shabnam Kousha, Washington, DC (US); Daniel E. Miller, Astoria, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/085,741

(22) Filed: Oct. 30, 2020

(65) Prior Publication Data

US 2022/0141303 A1  May 5, 2022

(51) Int. Cl.
| | | |
|---|---|---|
| G06F 15/16 | (2006.01) | |
| H04L 67/564 | (2022.01) | |
| H04L 67/02 | (2022.01) | |
| H04L 67/1031 | (2022.01) | |
| H04L 67/146 | (2022.01) | |
| H04L 67/1001 | (2022.01) | |

(52) U.S. Cl.
CPC .......... *H04L 67/2819* (2013.01); *H04L 67/02* (2013.01); *H04L 67/1002* (2013.01); *H04L 67/1031* (2013.01); *H04L 67/146* (2013.01)

(58) Field of Classification Search
CPC ... H04L 67/02; H04L 67/146; H04L 67/1002; H04L 67/1031; H04L 67/2819
USPC .......................................................... 709/227
See application file for complete search history.

(56) References Cited

U.S. PATENT DOCUMENTS

| | | | |
|---|---|---|---|
| 8,850,219 B2 * | 9/2014 | Dapkus ................. | H04L 9/3234 713/185 |
| 2003/0061360 A1 | 3/2003 | Chow et al. | |
| 2005/0198099 A1 * | 9/2005 | Motsinger ............... | H04L 67/22 709/200 |
| 2006/0031442 A1 * | 2/2006 | Ashley .................... | H04L 67/02 709/223 |
| 2011/0004878 A1 | 1/2011 | Divoux | |

(Continued)

OTHER PUBLICATIONS

International Search Report and Written Opinion for the International Patent Application No. PCT/US2021/057535, dated Apr. 4, 2022, 24 pages.

*Primary Examiner* — Moustafa M Meky
(74) *Attorney, Agent, or Firm* — KDB Firm PLLC

(57) ABSTRACT

Disclosed are techniques and apparatuses that are configured to receive an indication that a web browsing session executing on an enterprise server needs additional information based on a request for additional information being sent to a client device. The request may include an identifier of the web browsing session and an identifier of an enterprise server that initiated the web browsing session. A globally unique identifier related to the web browsing session and an identifier of the enterprise server is stored in a common data store. The web browsing session may be paused when the web browsing session requests additional information from a client device. The client device may respond with the additional information. The system may provide the identifier of the enterprise server to a load balancing component so the identified web browsing session executing on the enterprise server may continue to be used.

20 Claims, 6 Drawing Sheets

(56) References Cited

U.S. PATENT DOCUMENTS

| | | | |
|---|---|---|---|
| 2012/0117639 A1* | 5/2012 | Bouz | G06F 21/31 |
| | | | 726/10 |
| 2014/0108621 A1* | 4/2014 | Bryan | H04L 67/02 |
| | | | 709/219 |
| 2014/0108667 A1* | 4/2014 | Reddy | G06F 16/954 |
| | | | 709/228 |
| 2014/0380426 A1* | 12/2014 | Lin | G06F 21/31 |
| | | | 726/4 |
| 2018/0167426 A1* | 6/2018 | Sigurdsson | H04L 65/1069 |
| 2018/0365399 A1* | 12/2018 | Deutschmann | H04L 67/306 |

* cited by examiner

Common Data Store Record 500
- Web Browsing Session Identifier 510
  - Web Browsing Server Identifier 520

FIG. 5A

Common Data Store Record 500'
- Web Browsing Session Identifier 510
  - Web Browsing Server Identifier 520
    - Request Identifier #1 – Class of Additional Information
    - Request Identifier #2 – Class of Additional Information
    - Request Identifier #3 – Class of Additional Information
    - Request Identifier #4 – Class of Additional Information

FIG. 5B

Common Data Store Record 500"
- Web Browsing Session Identifier 510
  - Web Browsing Server Identifier 520
    - Request Identifier #1 – Class of Additional Information
    - Request Identifier #3 – Class of Additional Information
    - Request Identifier #5 – Class of Additional Information
    - Request Identifier #6 – Class of Additional Information

FIG. 5C

SCALABLE SERVER-BASED WEB SCRIPTING WITH USER INPUT

TECHNICAL FIELD

This application is directed to a server-based technology that provides effective and efficient communications between a client device and a third-party website via an enterprise server.

BACKGROUND

Server-side web scripting is a technique used in web development which involves employing scripts on a web server which produce a response customized for each user's (client's) request to the website. Server-side web scripting is distinguished from client-side scripting where embedded scripts, such as JavaScript, are run client-side in a web browser, but both techniques are often used together.

Server-side web scripting is often used to provide a customized interface for the user on the user's computing device, referred to as a client. These web scripts may assemble client characteristics for use in customizing the response based on the user's requirements, access rights, the assembled client characteristics, and the like. Server-side web scripting also enables the website owner to hide the source code that generates the interface. A down-side to the use of server-side web scripting is that the computing device needs to make further requests over the network to the server in order to show new information to the user via the web browser. These requests can slow down the experience for the user, place more load on the server, and prevent use of the application when the user is disconnected from the server.

When the server serves data in a commonly used manner, for example according to the hypertext transfer protocol (HTTP) or the file transfer protocol (FTP), users may have their choice of a number of client programs (most modern web browsers can request and receive data using both of those protocols). In the case of more specialized applications, programmers may write their own server, client, and communications protocol, which can only be used with one another. Programs that run on a user's local computer without ever sending or receiving data over a network are not considered clients, and so the operations of such programs would not be considered server-side operations.

In addition, in the situations when user input is needed, a load balancing server places, according to load balancing techniques, the website request in a queue for a next available hosting server according to traditional load balancing techniques. If traditional load balancing techniques are used, it is possible that the user input is not be routed to the server with the web session in place that is waiting for the particular user input, which means the script will not be able to resume executing.

SUMMARY

A system is disclosed that includes, in an enterprise server environment, a number of enterprise servers, a load balancing component, a common data store and an intermediary web scripting tracking component. Each enterprise server of the plurality of enterprise servers is configured to execute a number of web browsing sessions that provide a client device with access to third-party websites external to the enterprise server environment. The load balancing component may be configured to communicate with the client device that is external to the enterprise server environment. The common data store may be configured to maintain information related to a web browsing session initiated by at least one enterprise server of the plurality of enterprise servers. The intermediary web scripting tracking component may be coupled to the common data store, the load balancing component and each enterprise server of the number of enterprise servers. The intermediary web scripting tracking component may include programming code that when executed by a processor, the intermediary web scripting tracking component is operable to receive an indication that the web browsing session has been initiated by an enterprise server. The indication includes a web browsing session identifier of the web browsing session initiated by the enterprise server and an identifier of the enterprise server executing the web browsing session. A record in the common data store may be generated based on the received indication. The web browsing session identifier and the identifier of the enterprise server executing the web browsing session may be stored in association with the request identifier in the record in the common data store. An indication of a request for additional information related to the web browsing session may be received from the load balancing component. The indication of the request for the additional information may include the web browsing session identifier and the identifier of a server executing the web browsing session. A request identifier and a class of the additional information may be stored in common data store in association with the web browsing session identifier. A message may be received that indicates a response request related to the request for additional information has been received from the client device. The message may include the request identifier. The request identifier, the web browsing session identifier and the identifier of the enterprise server executing the web browsing session may be located in the common data store. A connection of the client device with the web browsing session executing on the web browsing server is enabled based on the web browsing session identifier and the identifier of the enterprise server executing the web browsing session associated with the located request identifier.

A non-transitory computer readable medium is disclosed. The non-transitory computer readable medium embodied with programming instructions when executed by a processor that causes the processor to perform functions. A call may be received from a client web browser participating in a web browsing session on an enterprise server for an application programming interface (API). The call may include API parameters, a web browsing session identifier of the web browsing session, and an identifier of the web browsing server executing the web browsing session identified by the web browsing session identifier. An identifier of an enterprise web browsing server executing a web browsing session associated with the web browsing session identifier may be located by accessing a common data store. The common data store may include information usable to locate a web browsing session associated with the web browsing session identifier that is active on an enterprise server identified by the identifier of the enterprise web browsing server. The processor may confirm that the web browsing session is active. In response to the web browsing session being confirmed as being active, the API parameters may be passed to an enterprise web browsing server associated with the identifier of the enterprise web browsing server to resume the web browsing session executing on the enterprise web browsing server associated with the located identifier of the enterprise web browsing server.

A method is disclosed that includes receiving an indication that a web browsing session has been initiated by an enterprise server. The indication may include an identifier of the web browsing session and an identifier of the enterprise server executing the web browsing session. A record may be generated in a common data store. The web browsing session identifier and the identifier of the enterprise server may be stored in the record. An indication of a request for additional information related to the web browsing session has been sent to a client device may be received. The indication of the request for the additional information related to the web browsing session includes a request identifier, a class of additional information requested by the web browsing session, the web browsing session identifier, and the identifier of the enterprise server. A message may be received that indicates a response request related to the request for additional information has been received. The message includes the request identifier. The web browsing session identifier and the identifier of the enterprise server are located in the common data store using the request identifier. A connection of the client device with the web browsing session associated with the located web browsing session identifier in the common data store executing on the enterprise server identified by the identifier of the enterprise server is enabled.

BRIEF DESCRIPTION OF THE DRAWINGS

FIGS. 5A, 5B and 5C illustrate examples of a data record in a common data store according to the examples of FIGS. 1 to 3.

DETAILED DESCRIPTION

Benefits and advantages of the present system, processes, techniques and computer readable media examples include being able to maintain the connectivity between a client device and the server executing a web browsing session with the client device. In addition to maintaining the connectivity between the client and the server, the following examples enable the re-establishment of the web browsing sessions due to a paused server-side web script with the client device for which the respective web browsing session was initiated. In addition, techniques for scaling the described examples of additional web servers in reliance on a number of available web browsing sessions.

In a general example, a client device may access an enterprise server that provides a first set of services, such as financial institution services (e.g., credit card issuance, banking functions, or the like) via a web browsing session, but may also be provided with additional services that may be related or unrelated to the enterprise services. The additional services may require the client device via the web browsing session to access a third-party website hosted by servers external to the enterprise server. The web browsing session hosted by the enterprise server may utilize server-side web scripts that may perform tasks, such as accessing the third-party website on the external server, on behalf of the client device. The third-party website may require a user log in or authentication operation. Logging in for the client device may require the user to provide information related to multi-factor authentication, whether that is a one-time code sent via text, knowledge based questions, or the like. Without knowing beforehand what values may be requested, or without having the required authentication information such as a one-time passcode, the user or the client device cannot provide the information that the server-side web script may need at the time the script execution is started.

The load balancing server may, according to some load balancing techniques, place a request for an API in a queue for a next available hosting server. The next-available hosting server, which may not be the same web browsing server that started the web browsing session in response to the initial web browser request, may restart a new web browsing session that begins with receipt of the multi-factor authentication. All of these actions take additional time and processing which delays the process for the user, introduces opportunities for failures, and the like. In order to solve this problem, the following techniques may be used to expedite the reconnection to the web browsing session that is waiting for the additional information from the user. In addition, examples provide an improved method of scaling a group of servers to mitigate these delays by utilizing a process that scales the enterprise server environment based on an available number of web browsing servers.

Figure 1:
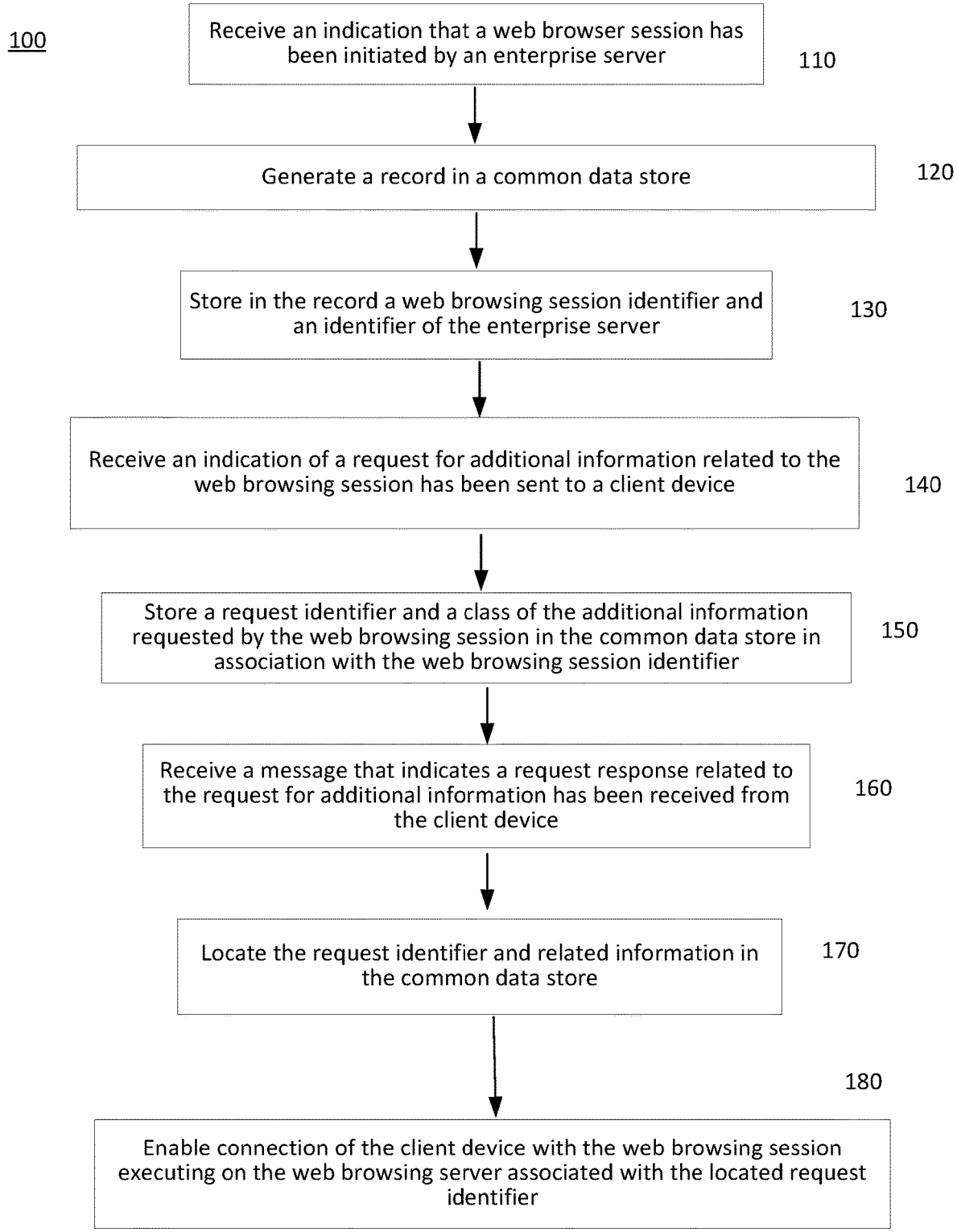
FIG. 1 shows a flow chart of an example of a scalable web scripting tracking process.

The following examples of processes and techniques utilize a system including a common data store and an intermediary web scripting tracking component. FIG. 1 illustrates a flowchart of an example process of a web scripting tracking process. In the example, a common data store (described in more detail with later examples) may be coupled to a number of servers that execute a number of websites and may be operable to maintain information related to a web browsing session initiated by at least one server of the number of servers. The intermediary web scripting tracking component may be coupled to the common data store, a number of load balancing components and the number of servers. The servers may be referred to as web browsing servers as at least one function of each respective server is to provide web browsing functionality.

The enterprise may partner or make available other entities' websites or portals via the enterprise's web browsing session with the client device (e.g., a smartphone, a laptop, a tablet, a PC, or the like). For example, an enterprise such as a financial institution may make it possible to connect a user's account with a user account of another entity in order to enable purchases to be paid for from the user's account at the financial institution.

The intermediary web scripting tracking component may include programming code that when executed by a processor is operable to implement process 100.

In an operational example described with reference to FIG. 1, a user via a client-side computer (e.g., the client device—a smartphone, a laptop, a tablet, a PC, or the like) may access an enterprise's web browsing server in an enterprise's server environment (described in more detail with reference to another example). Examples of the enterprise may be a bank or a financial institution, a membership club, an organization for retired persons, an educational or employment-related alumni organization, a fraternal organization, or the like. The user may desire to access, via the user's client device, the enterprise environment, in a financial institution example, so the user may activate a credit card issued or sponsored by the enterprise, update user information with the enterprise, create an account with the enterprise, or the like. The enterprise servers may establish a web browsing session between the user's client device and the enterprise servers.

In an example, the enterprise may partner or make available other entities' websites or portals that are external to the enterprise server environment via the enterprise's web browsing session with the client device. The websites may be an external website, which may be a website external to the enterprise server environment as shown or described in other examples. For example, an enterprise such as a financial institution may permit a user to connect a user's account with an account at another entity external to the enterprise server environment (such as an e-commerce retailer website, a car dealership website, affinity rewards website or the like) in order to enable purchases to be paid for from the user's account at the financial institution. As part of the agreement between the enterprise and its partners, the enterprise server may present links to the partner websites in a web browser participating in the web browsing session that enable the enterprise server to begin automated processes related to different services. Examples of automated processes (utilizing server-side web scripting) performed for the user in response to selection of a link to an external website may include, for example, automatically purchasing tickets for a play as soon as the tickets go on sale or changing a credit card number for an online retailer or the like.

Upon selecting one or more of the presented links to websites of an enterprise partner or may be another entity by the client device, a respective enterprise server of a number of enterprise servers may generate a respective web browsing session with each selected external website. Alternatively, the web browsing session provided by the enterprise server with the client device may enable the client device to input a uniform resource locator (URL) of an external website (e.g., another website) that the client device would like to communicate with to provide information, for example, related to the relationship between the user of the client device and the enterprise.

The enterprise server, for example, in response to receiving from the client device an input selecting a link to access another website outside the enterprise server environment through the web browsing session established with the enterprise server, may execute a server-side web script that is operable to connect to the external website. Using the server-side web scripts executing in the respective web browsing sessions on the enterprise servers (also referred to as web servers), the enterprise servers may communicate with third party servers to provide additional services to the client device.

For example, while the client device may have an authenticated connection with the enterprise, neither the client device nor the enterprise server may have an authenticated connection with the selected partner's or other entity's website. As the connection with the external website progresses, the external website may need additional information from the client device. The server-side web script may facilitate communication between the external website and the client device. When the need for additional information from the client device arises, the server-side web script executing on the enterprise server communicates the need for additional information to the client device as a request for additional information.

After the foregoing actions take place, the following processes shown in FIGS. 1 and 1A and as described below. The processes 100 and 105 of FIGS. 1 and 1A enable an enterprise server through which the client device has contacted the external website to effectively and efficiently manage the exchange of information between the client and the one or more external websites. At the initiation of the web browsing session by the enterprise server, the server, or another device, such as a load balancing component, may assign a web browsing session identifier to the web browsing session.

An intermediary web scripting tracking component (IWSTC) utilized in the example process 100 of FIG. 1 may be a software component, a hardware component, a combination of software and hardware, or the like.

In process 100, for example, the IWSTC may receive, at 110, an indication that a web browsing session has been initiated by an enterprise server. The indication may include an identifier of the enterprise server (i.e., the web browsing server identifier or server identifier) that is executing a web browser providing the web browsing session and the identifier of the web browsing session (i.e., the web browsing session identifier). The indication may be received by the IWSTC from the enterprise server that implemented the web browsing session (also referred to as the web browsing server) or may be received from a load balancing component within the enterprise server environment.

At 120, in response to the received indication, the IWSTC may generate a record in a common data store (shown in another example). The record may be populated, at 130, with a web browsing session identifier and an enterprise server identifier of the enterprise server administering the web browsing session. An example of a record 500 as shown in FIG. 5A includes at least a web browsing session identifier 510 and a web browsing server identifier 520.

During the web browsing session, a server-side web script may be executed to gain access to a third-party website that is external to the enterprise server environment. The third-party website may require information, such as user identifying information, one-time password, or the like. For example, e-commerce applications, services websites or e-mail servers may require additional user input at the initiation of the web browsing session.

In an example of the e-commerce application, the e-commerce application may require the user to log in. Logging in for the user, for example, may require the user to provide log-in information, which may include information, for example, related to multi-factor authentication or other information. In the example, the web browsing server may utilize a server-side web script that implements multi-factor authentication, whether it is a one-time code sent via text, knowledge-based questions, or the like. Since the user does not know the form of the multi-factor authentication or does not yet have the additional information requested to provide a response, such as a one-time password, to complete the multi-factor or step up authentication, the user cannot provide the information before the server-side web script starts executing or, if the server-side web script is already executing, perhaps before the server-side web script would complete executing.

In response to the informational authentication requirements from the external website, the server-side web script executing on the web browsing server may send a request for additional information to the client device. After the server-side web script makes the request for additional information, the server-side web script may pause to wait for the additional information required by the third-party website.

At 140, the IWSTC may receive an indication that a request for additional information related to the web browsing session has been sent to a client device. The indication may be received from the web browsing session executing on web browsing server. The web browsing session may be identified by the respective web browsing session identifier and the respective enterprise server identifier. Alternatively, the IWSTC may monitor the transmissions between the web browsing servers and a load balancing component that sends communications to the client device, and provide an indication based on the monitored transmissions. As another alternative, the load balancing component may send to the IWSTC the indication that a request for additional information related to the web browsing session was sent to the client device.

In an example, the web browser executing on the enterprise server may identify a need for additional data (by the executing web script). For instance, the web browser may determine that a field does not have a value or has an improper value. The executing web script may also be configured to look for information in one of a few fields, and when it sees which one the external site renders, the web script may be configured to pause and request the additional information. In the example, the paused web script is configured to call the IWSTC to ask it to request the additional information from the client device.

The request for additional information may, for example, be a request for the additional authentication information being sent to the client-based web browser, the browsing session executing on the web browsing server is paused as the web browsing server waits for the user input of the authentication information. The authentication information may be a one-time code sent to a user device via text, knowledge-based questions (e.g., name of first pet, mother's maiden name, or did you own a Buick?) or the like.

While authentication information is used as an example, other information, in addition to, or different from the authentication information may be needed, such as payment method information (e.g., credit card number or digital payment account information), residence address information, contact information or the like. For example, the additional information requested may be responses to questions, such as, please enter your username?, what is your household income?, please provide your residence address?, please enter the code texted to you?, or the like. Other examples for pausing the browsing session include processes related to ticket purchases, such as reserving tickets, or the like.

The request for additional information may include a class of the additional information requested by a server-side web script executing with the web browsing session related to the web browsing session identifier. The additional information to be accepted by the IWSTC, load balancing component, or the web browsing session may have to meet format requirements of the requested additional information. For example, these types of additional information may be assigned a class or category, such as numerical, alphanumerical, textual, phrase, or the like. The class may also indicate a defined pattern of or a format, such as 5-8 digits for a household income response, alphabetical characters for a user's last name response, or alphanumeric format for a residence address, and the like. Alternatively, the class may be in the form of a category, such as residence address, income, phrase, word, keyboard characters, or the like, which is given an alphanumeric or numeric value type code (e.g., 026 for income or D7071 for number of dependents). The class of the requested additional information may be used to verify that a response request contains requested additional information meeting a format requirement of the requested additional information. A load balancing component, an IWSTC, or both may perform the verification. If the format requirement cannot be verified, the request may be resent to the client device.

While waiting for the user to respond to the request for additional information, the web browsing server may stop executing, or pause, the web browser script as part of the web browsing session. The web browsing server may, for example, start a timer while it waits for the client to respond. If the client does not provide the additional information before the timer expires, the web browsing server may close the web browsing session.

The IWSTC, in response to receiving the indication of the request for additional information (at 140), may assign a request identifier for the request for additional information and store the request identifier and a class of the additional information related to the requested by the web browsing session in the common data store in association with the request identifier (150). The indication of the request for additional information may include a class of the request or other information that enables the identification of the type or format of additional information that is to be received from the client device. The class of the request or other information that identifies or enables the identification of, the additional information that is to be received may be stored as the additional information as shown in FIGS. 5B and 5C.

In more detail, the additional information may include the value type identification of the specific information requested, such as username, password information, a verification code sent to another user device (e.g., a text message to a smart phone), or the like. For example, the value type identification may be a category number assigned to the additional information (e.g., 026 for income). The value type identification additional information may be stored as the class of the additional information in association with the request identifier with the web browsing session identifier and the enterprise server identifier in the common data store.

Similar to the web server identifier and the web browsing session identifier, the request identifier may be a globally unique identifier that can be stored with data (e.g., class of the additional information requested) related to the request and in association with the web server identifier and with the web browsing session identifier.

As shown in the example of FIG. 5B, the IWSTC may be operable to, as requests for additional information are generated by the server-side web script(s) executing in the web browsing session, assign a request identifier (e.g., #1, #2, #3, #4 and so on) to each request for additional information, and the data included in the indication of the request for additional information. There may be occasions when multiple requests for additional information are pending a response. Some of the requests may require user input, while others may require information that may be obtained by applications or processes executed by the client device, for example, automatically without user input (such as information for pre-authorized services or websites). The common data store record 500 of FIG. 5A may be updated as shown in common data store record 500' of FIG. 5B. For example, as shown in common data store record 500', the request identifier #1, the request identifier #2, the request identifier #3, and the request identifier #4 may be generated and the web browsing session identified by web browsing session identifier 510 is waiting for responses to requests for additional information related to the respective request identifiers #1-#4.

As responses from the client device are received at a load balancing component of the enterprise server environment, the IWSTC may update the records in the common data store. In the example of FIG. 5B, the common data store record 500' of FIG. 5B may be updated as the respective requests are satisfied, and new requests are generated. As requests for additional information are satisfied and new requests for additional information generated, IWSTC may update the common data store. For example, the common data store record 500' may be updated as requests for additional information associated with request identifiers #2 and #4 are satisfied, and additional requests for additional information are received and are assigned request identifier #5 and request identifier #6. The IWSTC may update common data store record 500', which after updating may appear as shown in FIG. 5C, in which the common data store record 500" of FIG. 5C includes web browsing session identifier 510 that is associated with web browsing server identifier 520 which is associated with request identifiers #1, #3, #5 and #6. As such, a processor implementing an IWSTC may be operable to determine from the enterprise server that another web browsing session having another web browsing session identifier has expired. For example, the web browsing session identified by web browsing session identifier 510 may have expired. As such, the processor may update a record in the common data store (e.g. 500" of FIG. 5C) with another web browsing session identifier by removing the another web browsing session identifier and any corresponding request identifier or request identifiers, such as request identifier #1, request identifier #3, request identifier #5, and request identifier #6. In a further example, the IWSTC may determine from information provided by the enterprise server that another web browsing session having another web browsing session identifier has expired. In response, the IWSTC may update a record in the common data store, such as 500" of FIG. 5C, having the another web browsing session identifier by removing the another web browsing session identifier and any corresponding request identifier associated with the expired another web browsing session.

The client device may be updated with the requests for additional information that are pending (i.e., requiring a response from the client device) by receiving a push notification from the IWSTC or by polling the IWSTC. For example, the client device may send a status request to the IWSTC with a web browsing session identifier, which the IWSTC uses in a search of the common data store. Using information in the update, the client device may generate additional prompts for user input or attempt to retrieve the requested additional information and return a message containing the additional information to satisfy the respective requests for additional information.

In response to the request for the additional information, either the user inputs or an application on the client device obtains and returns the information requested to satisfy the request for additional information. The client device may send a request response to the request for additional information that includes the requested additional information, such as the one-time password, security code information of a credit card or the like. The request response may be received by a load balancing component, which may be a server, in the enterprise server environment. The request response to the request for additional information, in addition to containing the additional information, may contain the request identifier or the web browsing session identifier.

The load balancing component may generate a message that the request response was received and forward the message to the IWSTC. In the example, the IWSTC may receive from the load balancing component the message that a response to the request for additional information has been received from the client device (160).

The received message may also include the request identifier, the web browsing session identifier related to the request for additional information, or both.

The IWSTC may access the common data store and locate the request identifier and related information in the common data store (170). For example, the IWSTC may retrieve the common data store record associated with the located request identifier from the common data store. The IWSTC using information provided in the message may obtain the web browsing session identifier and the web browsing server identifier.

Using the located web browsing server identifier and/or the web browsing session identifier, the IWSTC may enable reconnecting the client device with the web browsing session executing on the web server associated with the located request identifier (180).

In an alternative example at steps 110 and 120 of FIG. 1, when an enterprise web server starts a web browsing session and needs user input, the enterprise web server may register a globally unique identifier with the web browsing session identifier that indicates which web browsing session needs the additional information, what additional information is requested, and what node (i.e., server) as indicated by web browsing server identifier the web browsing session associated with the web browsing session identifier is executing on. At that point, the load balancing component may either push to the client device the request for more data, or it can set up an endpoint that can be polled by the client device to get the status of the request for additional information (the request may also be referred to as a call), at which point the client device receives the request for additional information.

Once the additional information is provided by the client device, as in step 160, the IWSTC may look up in the common data store which web browsing server in the enterprise environment requested the additional information, and provide the web browsing server identifier to the load balancing component for routing the traffic accordingly, instead of routing the traffic based on traditional load management strategies. In the example, if the server is no longer responsive (e.g., because the web browsing session timed out), then the load balancing component may provide an error message to the client device and allow the user via the client device to optionally restart the automated server-side scripts. The automated server-side scripts may be reassigned to an available web browsing server within the enterprise server environment based on traditional load management strategies.

More details of steps 160-180 of process 100 in FIG. 1 are described with reference to the example process 105 of FIG. 1A.

Figure 1A:
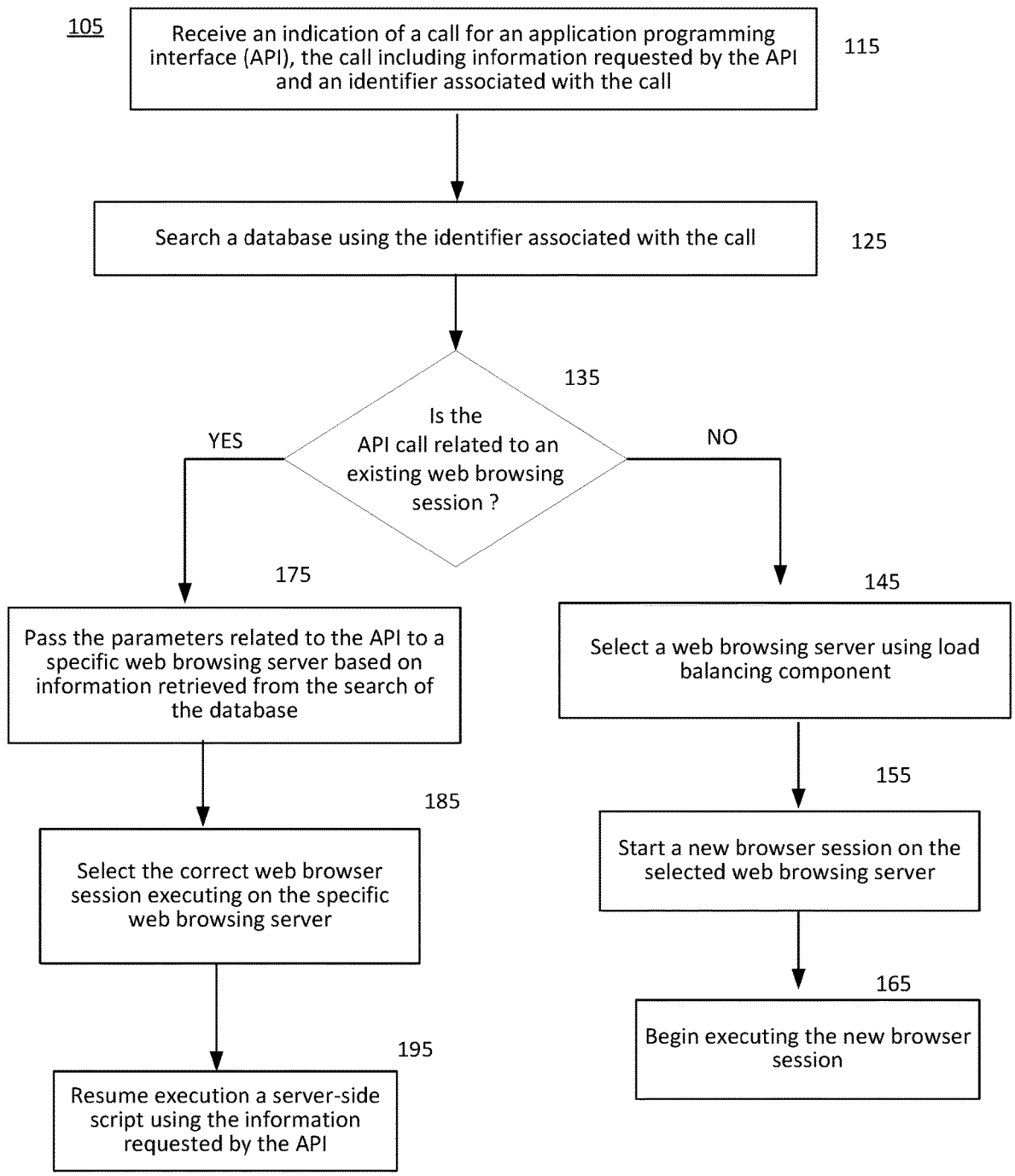
FIG. 1A shows an example of a scalable process for maintaining continuity of a web browsing session according to the examples disclosed herein.

FIG. 1A shows an example of a process for evaluating a response from a client device that contains information in response a request for additional information.

The web browsing session on the enterprise web server that is established between the client device and the third party server may need additional information to continue providing services or information to the client device. A server-side script running on the enterprise web server may be operable to forward the request for additional information to the client device. The server-side script may have an application programming interface (API) that is operable to receive the additional information from the client device. The server-side script may pause as may the web browsing session while both wait for the client device to respond to the request. Process 105 may be implemented to manage receipt of the additional information from the client device in response to the request for additional information, as in step 160 of FIG. 1, and proceeds with a detailed process that includes enabling the connection of the client device with the web browsing session at 180.

In process 105, the IWSTC may, for example, receive an indication of receipt of call for an API (i.e., a response message to a request for additional information) related to the web browsing session executing on a web browsing server in the enterprise server environment (115). The indication of the call, also referred to as an API call, may, for example, be received from a load balancing component that is one of a number of load balancing components in the enterprise server environment. The API call may only include an identifier associated with the API call and the requested additional information. Alternatively, the API call may include the web browsing session identifier, information related to the additional information requested by the web browsing session, the web server identifier, and a request identifier that is a globally unique identifier of the API call.

A database in the common data store may store parameters related to the API (e.g., format of the data requested by the API) that satisfy the API call. The identifier associated with the API call may be a request identifier assigned to the call by the IWSTC for storage in the common data store. The request identifier assigned to the API call may be stored in a database of the common data store in relation to a web browsing session identifier. Alternatively, the request identifier assigned to the API call may be stored in a database of the common data store in relation to a web browsing server identifier upon which the web browsing session that requires the information provided in the API call is executing. In a further example, the IWSTC may store in the common data store the parameters of the API, the web browsing session identifier of the web browsing session, and an identifier of an enterprise web browsing server executing the web browsing session identified by the web browsing session identifier in the generated record. Based on the parameters of the API included in the API call, the IWSTC may be configured to identify a web script that is paused based on the parameters of the API included in the API call. The IWSTC may update the record in the common data store to include an identifier associated with the identified web script that is paused.

At 125, the IWSTC may access the database within the common data store and search the database using the identifier assigned to, or associated with, the API call. The IWSTC may determine, at 135, whether the API call is related to an existing web browsing session based on the information in the database.

If the result of the determination at 135 is, Yes, the API call is related to an existing browsing session executing on a web browsing server in the enterprise environment. The process 100 may proceed to 175, where the IWSTC may pass the parameters related to the API to the specific web browsing server executing the specific web browsing session that prompted the API call. The passing of the parameters may be via a load balancing component in the enterprise server environment. The specific web browsing server using the information indicating the specific web browsing session and the API parameters may select the correct web browsing session (185) to receive the information provided with the API call. The paused server-side script web script and the web browsing session may resume execution using the information provided with the API call (195).

Alternatively, if the result of the determination at 135 is No, the API call is not related to an existing browsing session executing on an enterprise server. For example, as web browsing sessions time out, the web browsing session may no longer be executed by an enterprise web server. As a result, an IWSTC may determine from the enterprise web server that the web browsing session having a web browsing session identifier has expired. The IWSTC may update the record having that web browsing session identifier by removing any corresponding request identifier(s) associated with that web browsing session identifier from the common data store. The process 105 may proceed to 145, where the load balancing server may select a web browsing server based on one or more balancing techniques implemented by the load balancing component. For example, the one or more load balancing techniques include evaluating real-time metrics related to central processing unit (CPU) usage, memory usage, random assignment, or the like. Alternatively, instead of the one or more known balancing techniques at 145, information in the common data store may be used to determine how many active web browsing sessions are simultaneously performing operations for customers and if an additional web browsing server that is under a threshold of use may be selected to be started based on the threshold. Examples of the threshold of use may a number of web browsing sessions, such as 10, 25, 50 or the like, that are simultaneously on a web browsing server, but the threshold of use may depend on a size of the web browsing server and usage of the web browsing server memory and CPUs by the web browsing sessions. In an example, an active web browsing session may register with the common data store when it starts up (e.g., by providing the web browsing session identifier or other information). The active web browsing session may, in addition or alternatively, regularly send an active state to the common data store. In an example in which this active update is not received from the particular web browsing session, logic may flag the particular web browsing session as timed out in the common data store. In another alternative, the web browsing session may also indicate to the common data store when it has completed its tasks, so that the count of the number of active web browsing sessions may be decremented.

After selecting a web browsing server at 145, the selected web browsing server may start a new browsing session (155) and new information related to the new browsing session may be stored in the common data store. Records in the common data store database may be updated or deleted after expiration of a period of time. The selected web browsing server may begin executing the new browsing session (165). The process 105 enables enterprise web servers to more efficiently and effectively manage and scale web browsing sessions with third-party web servers implemented on behalf of client devices utilizing servers of the enterprise server environment.

Figure 2:
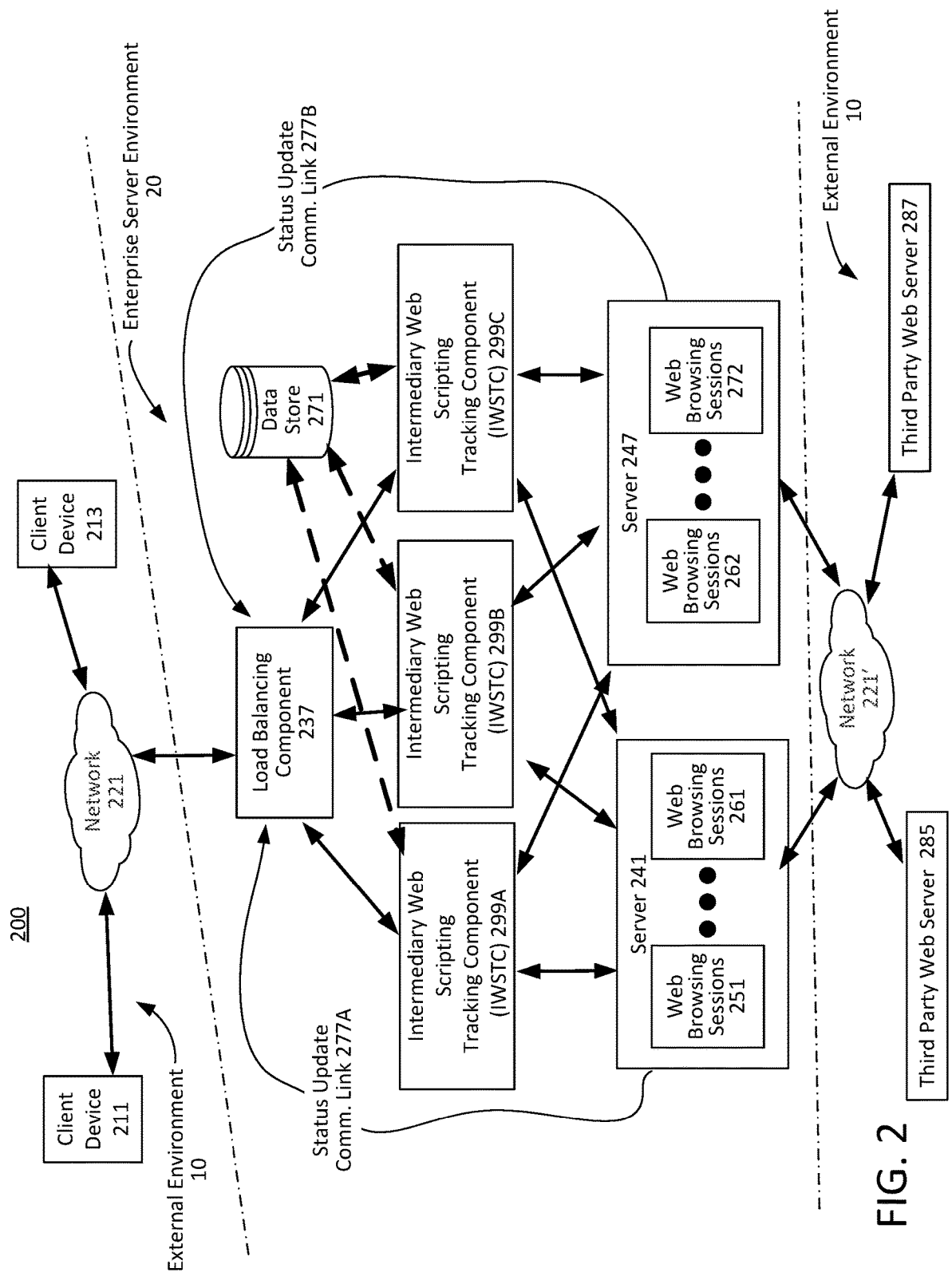
FIG. 2 provides a functional block diagram of an example of a system suitable to implement a scalable web tracking component as in the examples described herein.

FIG. 2 provides a functional block diagram of an example of a system that includes an example implementation of a scalable web tracking component.

The example system 200 may include an external environment 10 and an enterprise server environment 20. The external environment 10 may include a network 221, such as the internet, to which is coupled to a client device 211 and a client device 213. The client devices 211 and 213 may each be a computing device, such as a laptop, smartphone, tablet or the like, which is participating in the web browsing sessions described above with reference to the process examples of FIGS. 1 and 1A.

The enterprise server environment 20 may be implemented in a cloud-based networking platform (not shown) or may, for example, be a large data center network implementation and may include various components. The servers 241 and 247 may, for example, may be web browsing servers in the enterprise server environment 20 that are operable to implement and provide a number of browsing sessions 251-261 and 262-272 for use by client devices such as 211 and 213. For example, the servers 241 and 247 may be configured with software that cause the servers 241 and 247 to perform functions to provide the web browsing sessions 251-261 and 262-272. While only client devices 211 and 213 are shown, it should be understood that a larger number of client devices may be communicatively coupled to the enterprise server environment 20 and participating in web browsing sessions offered by the servers 241 and 247. The client devices 211 and 213 in the external environment 10 may connect to the enterprise server environment 20 via the network 221, which may be the internet. Client devices 211 and 213 may include computer applications, such as a web browser, enterprise-specific computer applications that enable secure coupling to the enterprise server environment 20.

The servers 241 and 247 may be operable to initiate and maintain web browsing sessions 251-261 and 262-272, respectively, with third-party web servers 285 and 287 via the network 221'. The third-party web servers 285 and 287 may be operable to provide the web browsing sessions 251-261 and 262-272 access via the network 221' to email applications, messaging applications, e-commerce websites, streaming content (e.g., video and movie services), news websites (e.g., financial news, current events, or the like), credit card websites, and the like. The network 221' may be the same network as network 221. For example, both network 221 and network 221' may be the internet.

The load balancing component 237 may be communicatively coupled with a plurality of intermediary web scripting tracking components (IWSTC) 299A, 299B and 299C. The IWSTC 299A-299C are communicatively coupled to the common data store 271. The IWSTC 299A-299C may be implemented as software, hardware, firmware or a combination of each. The IWSTC 299A-299C may be configured to access the common data store 271 to implement the functions described above with reference to FIGS. 1 and 1A.

The load balancing component 237 may interact with the respective IWSTC 299A-229C to perform the process functions described with reference to FIGS. 1 and 1A. The load balancing component 237 may be software that executes on a server, may be implemented as circuitry on a server, or may be combination of both hardware and software. The load balancing component 237 may be operable to communicate as described with reference to FIGS. 1 and 1A with servers 241 and 247 via the IWSTC 299A-299C.

The servers 241 and 247 may be referred to as web browsing servers as at least one function of each respective server is to provide web browsing functionality. For example, the servers 241 and 247 may be operable to implement the respective web browsing sessions 251-261 and 262-272 based on instructions received from each of the respective load balancing components. At least one of the respective web browsing sessions 251-261 and 262-272 may be conducted with the client device 211 according to the process 100, or processes 100 and 105, of FIGS. 1 and 1A above.

The web servers 241 and 247 may provide status updates related to one or more of the web browsing sessions 251-261 to the load balancing component 237 via respective status update communication links 277A (for web server 241) and 277B (for web server 247). For example, each web browsing session 251-261 on web browsing server 241 may be active and engaged with a client device and a website provided by one of the third-party servers 285 and 287. The web server 241 may provide via the status update communication link 277A an update of each of respective web browsing session 251-261 to the load balancing component 237. The update may include a web browsing session identifier and a corresponding status of the web browsing session associated with the web browsing session identifier. The load balancing component 237 may provide the status updates to, or allow access to the status updates by, an IWSTC 299A, 299B or 299C. The respective IWSTC of the IWSTCs 299A, 299B or 299C may update the respective web browsing session in the common data store 271. The updates may be provided to the respective client devices 211 and 213 depending upon the respective web browsing sessions in which the respective client devices 211 and 213 are participating. For example, if client device 211 is participating in web browsing session XYZ, the client device 211 may be operable to poll an IWSTC (any of IWSTC 299A, 299B or 299C). For example, the client device 211 may send a status request to the IWSTC 299B with all the web browsing session identifiers in which it is participating via the enterprise server environment 20. The IWSTC 299B may use the web browsing session identifiers in a search of the common data store 271 and retrieve the status updates of each web browsing session and return the status updates. Alternatively, a respective IWSTC of IWSTCs 299A, 299B or 299C may push the status updates of the respective web browsing sessions that the client device 211 is participating to the client device 211. The respective client devices 211 and 213 may be operable to use information in the status update to generate additional prompts for user input or attempt to retrieve any of the requested additional information related to a status and return a message containing the requested additional information.

The web browsing sessions 251-261 and 262-272 may enable content/services from the third party servers 285 or 287 to be delivered to the client device 211. The content/services may be maintained in the respective servers 285 and 287 or may be maintained by other servers (that are not shown in this example for ease of illustration). The content/services may be any form of content or services, such as financial institution services (such as loan or credit application), streaming video content, or the like.

A respective IWSTC of IWSTCs 299A-299C may receive via the coupling to the respective server 241 or server 247 an indication that a web browsing session (e.g., 251 or 267) has been initiated by the respective server 241 or 247. The indication may include information, such as a web browsing session identifier and an identifier of the respective server. An IWSTC of IWSTCs 299A-299C may be operable as described above with reference to FIG. 1 to generate the request identifier and store the information provided with the indication in association with the request identifier in the common data store 271.

For example, the respective IWSTC of IWSTCs 299A-299C may be operable to maintain the common data store 271 with information related to requests for additional information, web browsing sessions, such as 251-261 and 262-272, and web browsing servers, such as 241 and 247. The respective IWSTC of IWSTCs 299A-299C may be operable to perform a number of functions as well as the other examples of functions described above with reference to FIGS. 1 and 1A.

In addition to the IWSTC processes described above with respect to FIGS. 1 and 1A, each of the IWSTCs 299A, 299B or 299C may be operable to assist the load balancing component 237 of the enterprise server environment with tasks, such as distributing workload between the respective web browsing servers and starting additional web browsing servers as the number of user requests for web browsing sessions increases or decreases. The input from the respective IWSTC of IWSTCs 299A-299C may be used as a priority input by the load balancing component 237 that overrides any known load balancing techniques.

Figure 3:
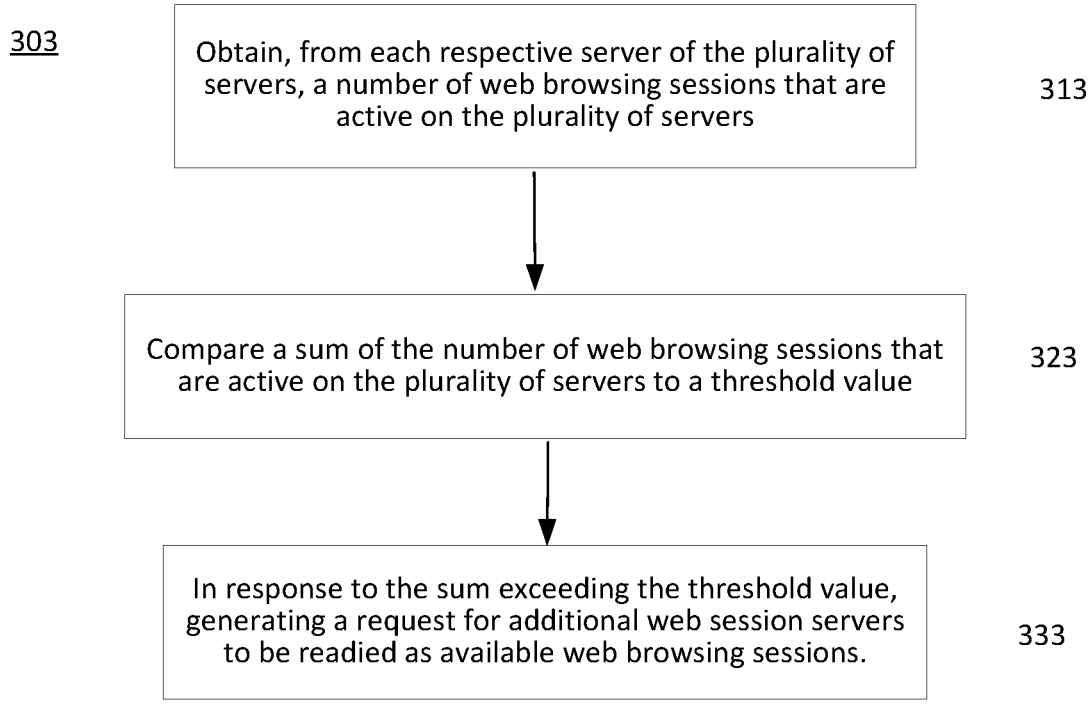
FIG. 3 illustrates a flowchart of another example process of a scalable web scripting tracking process.

FIG. 3 illustrates a flowchart of another example process of a scalable web scripting tracking process. The example process 303 may be implemented in an example system such as 200 of FIG. 2. In the example system, a common data store (such as 271 of the previous system example) may be coupled to a number of servers that execute a number of web browsing sessions operable to deliver content from websites to one or more client devices. The common data store may be operable to maintain information related to a web browsing session initiated by at least one server of the number of servers. A respective IWSTC, such as one of IWSTCs 299A-299C of FIG. 2, may be coupled to the common data store, the load balancing component and the number of servers. The respective IWSTC may include programming code that when executed by a processor is operable to implement process 303.

Instead of using traditional load balancing strategies (e.g., CPU usage, memory usage, random assignment, and the like), the IWSTC may instead use data stored in the common data store to begin scaling the number of web browsing sessions that are available in response to web browsing requests received by the respective load balancing components.

A process, such as 303, may enable the IWSTC to determine when it is necessary to scale the number of web browsing sessions based on levels of activity. For example, the IWSTC may be configured to obtain, from each respective server of the number of web browsing session servers, a number of web browsing sessions that are active on the number of web browsing session servers (313). The IWSTC may be configured to, in an example, maintain a threshold number of servers that execute web browsing sessions. The threshold number may be based on different metrics such as quality of service, execution speed and other performance parameters that meet an expected level of customer service (e.g., 90% of clients requesting access are provided access within 10 seconds of receipt of request, each web browsing server may hold some number (e.g., 10, 15) of web browsing sessions and scaling upward may begin when utilization hit a certain percentage of web browsing sessions, or the like). Any metric or metrics may require monitoring by a component of the system, such as an IWSTC or the like. In a more detailed example, scaling may occur based on a utilization threshold setting. The system may have a utilization threshold setting of 75%, for example. In other words when utilization exceeds 75% another web browsing server may need to be started. In the detailed example, the system may include four servers that are each configured to execute ten web browsing sessions. With the utilization threshold setting at 75%, once a $31^{st}$ browsing session was created, the process 303 may start a new web browsing server.

The IWSTC may be configured to determine when the web browsing session is no longer active and when another web browsing session is activated. Based on the determinations, the IWSTC may update the common data store by eliminating web browsing session identifiers associated with the web browsing sessions that is no longer active and populating records in the common data store with web browsing session identifiers of activated web browsing sessions.

At 323, the IWSTC may be configured to compare a sum of the number of web browsing sessions that are active on the number of servers to the threshold value.

The IWSTC, in response to the sum exceeding the threshold value, may be configured to generate and send a request for additional web browsing servers to be readied as available to provide additional web browsing sessions (333). The generated request for additional web sessions may be forwarding to a load balancing component configured to instantiate additional web browsing sessions servers that are configured to instantiate additional web browsing sessions.

Figure 4:
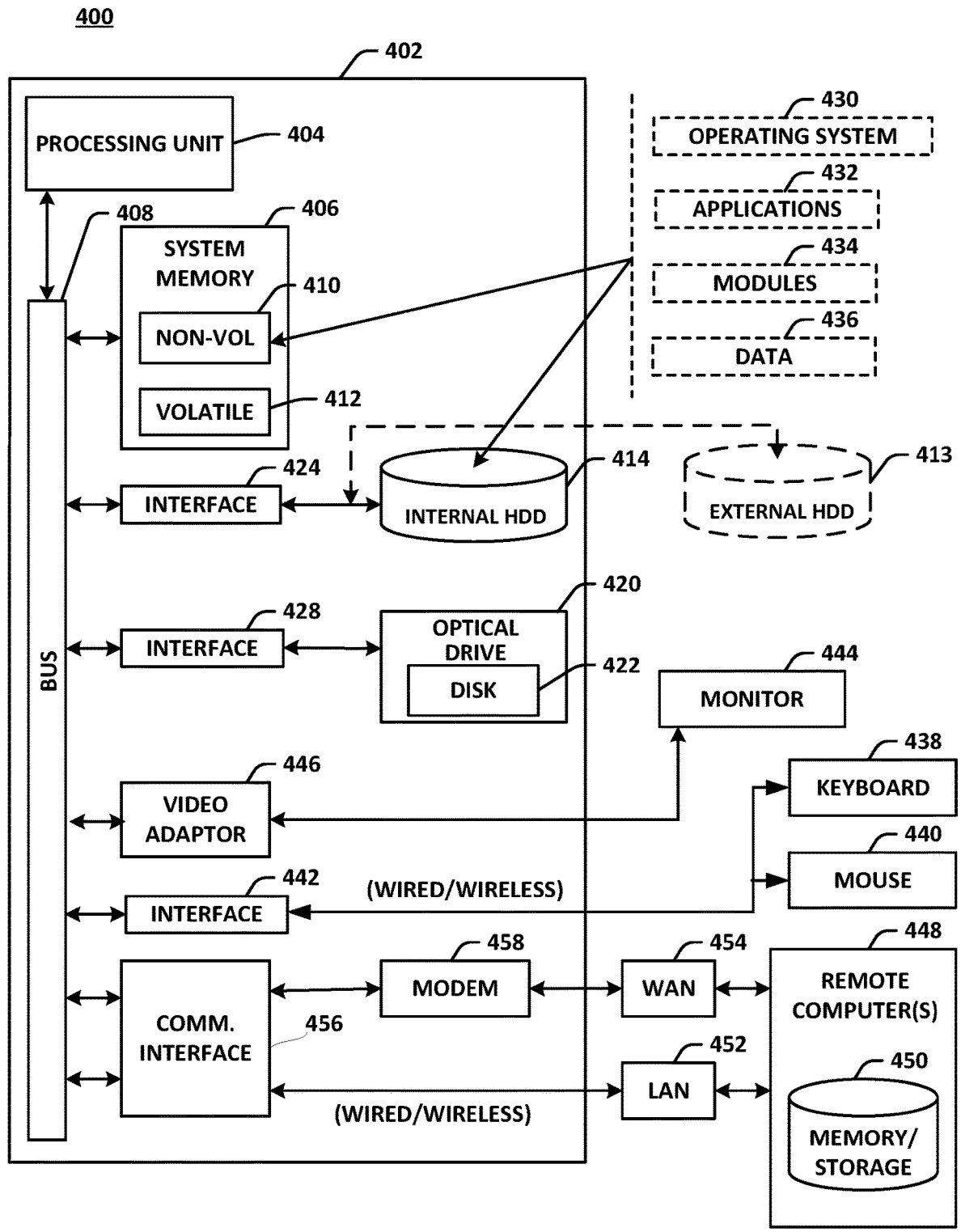
FIG. 4 illustrates an example of a computer architecture suitable for implementing examples of a scalable web scripting tracking component.

FIG. 4 illustrates an example of a computing architecture suitable for implementing various examples as previously described. In one example, the computing architecture 400 may include or be implemented as part of system 200 or 202. For example, the computing architecture 400 with some additions and deletions may be suitable to implement the load balancing component 237, the client devices 211, 213, IWSTCs 299A-299C, and the servers 241 and 247 of FIG. 2.

As used in this application, the terms "system" and "component" are intended to refer to a computer-related entity, either hardware, software, a combination of hardware and software, or software in execution, examples of which are provided by the computing architecture 400 as well as described with reference to the examples of FIGS. 1, 1A, and 3. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server or a processor and the server or the processor can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further examples, however, may alternatively employ data messages. Such data messages may be sent across various connections. Exemplary connections include parallel interfaces, serial interfaces, and bus interfaces.

The computing architecture 400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The examples, however, are not limited to implementation by the computing architecture 400.

As shown in FIG. 4, the computing architecture 400 includes a processing unit 404, a system memory 406 and a system bus 408. The processing unit 404 can be any of various commercially available processors. For example, depending upon the implementation of enterprise server environment 20, servers 285 and 287, enterprise servers 241 and 247, load balancing component 237, IWSTC 299A-C, and components thereof, may, incorporate one or more of the components of the computing architecture 400, such as the processing unit 404, the system memory 406 and so on. Other components, such as the keyboard 438 and the mouse 440, may be omitted in some examples, such as implementations of a load balancing component or server.

The system bus 408 provides an interface for system components including, but not limited to, the system memory 406 to the processing unit 404. The system bus 408 can be any of several types of bus structure that may further interconnect to a memory bus (with or without a memory controller), a peripheral bus, and a local bus using any of a variety of commercially available bus architectures. Interface adapters may connect to the system bus 408 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 400 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Examples may also be at least partly implemented as instructions contained in or on a non-transitory computer-readable medium, which may be read and executed by one or more processors to enable performance of the operations described herein.

The system memory 406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the example shown in FIG. 4, the system memory 406 can include non-volatile memory 410 and/or volatile memory 412. A basic input/output system (BIOS) can be stored in the non-volatile memory 410.

The computer 402 may include various types of computer-readable storage media in the form of one or more lower speed memory units, including an internal hard disk drive (HDD) 414 or an optional external hard disk drive (HDD) 413, and an optical disk drive 420 to read from or write to a removable optical disk 422 (e.g., a CD-ROM or DVD). The HDD 414 and optical disk drive 420 can be connected to the system bus 408 by an HDD interface 424 and an optical drive interface 428, respectively. The HDD interface 424 for external drive implementations can include at least one or both of Universal Serial Bus (USB) and IEEE 1394 interface technologies. The drives and associated computer-readable media provide volatile and/or nonvolatile storage of data, data structures, computer-executable instructions, and so forth. For example, several program modules can be stored in the drives and memory units 410, 412, including an operating system 430, one or more application programs 432, other program modules 434, and program data 436. In one example, the one or more application programs 432, other program modules 434, and program data 436 can include, for example, the various applications and/or components of the computing architecture 400.

Computing architecture 400 may be utilized as a client device. As a client device, a user can enter commands and information into the computer 402 through one or more wire/wireless input devices, for example, a keyboard 438 and a pointing device, such as a mouse 440. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touchscreens (e.g., capacitive, resistive, etc.), trackballs, track pads, sensors, styluses, and the like. These and other input devices are often connected to the processing unit 404 through an input device interface 442 that is coupled to the system bus 408 but can be connected by other interfaces such as a parallel port, IEEE 1394 serial port, a game port, a USB port, an IR interface, and so forth.

A monitor 444 or other type of display device is also connected to the system bus 408 via an interface, such as a video adaptor 446. The monitor 444 may be internal or external to the computer 402. In addition to the monitor 444, a computer typically includes other peripheral output devices, such as speakers, printers, and so forth.

The computer 402 may operate in a networked environment using logical connections via wire and/or wireless communications to one or more remote computers, such as a remote computer 448. The remote computer 448 can be a workstation, a server computer, a router, a personal computer, portable computer, microprocessor-based entertainment appliance, a peer device or other common network node, and typically includes many or all the elements described relative to the computer 402, although, for purposes of brevity, only a memory/storage device 450 is illustrated. The logical connections depicted include wire/wireless connectivity to a local area network (LAN) 452 and/or larger networks, for example, a wide area network (WAN) 454. Such LAN and WAN networking environments are commonplace in offices and companies, and facilitate enterprise-wide computer networks, such as intranets, all of which may connect to a global communications network, for example, the Internet.

When used in a LAN networking environment, the computer 402 may be connected to the LAN 452 through a wire and/or wireless communication interface 456. The communication interface 456 can facilitate wire and/or wireless communications to the LAN 452, which may also include a wireless access point disposed thereon for communicating with the wireless functionality of the communication interface 456.

When used in a WAN networking environment, the computer 402 can include a modem 458, or is connected to a communications server on the WAN 454 or has other means for establishing communications over the WAN 454, such as by way of the Internet. The modem 458, which can be internal or external and a wire and/or wireless device, connects to the system bus 408 via the input device interface 442. In a networked environment, program modules depicted relative to the computer 402, or portions thereof, can be stored in the remote memory/storage device 450. It will be appreciated that the network connections shown in FIG. 4 (as well as those of FIGS. 2 and 2A) are exemplary and other means of establishing a communications link between the computers can be used.

The computer 402 is operable to communicate with wired and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-5C may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The foregoing process examples may be provided as a non-transitory computer readable medium executable by a computer to provide a particular machine.

Various examples also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single example for streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

What has been described above includes examples of the disclosed processes, techniques, computer readable programming code, systems and a computer architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications, and variations that fall within the spirit and scope of the appended claims.

What is claimed is:

1. A system in an enterprise server environment, comprising:
   a plurality of enterprise servers, wherein:
      each enterprise server of the plurality of enterprise servers is configured to execute a plurality of web browsing sessions that provide a client device with access to third-party websites external to the enterprise server environment;
   a load balancing component configured to communicate with the client device that is external to the enterprise server environment;
   a common data store configured to maintain information related to a web browsing session, of the plurality of web browsing sessions, initiated by at least one enterprise server of the plurality of enterprise servers; and
   an intermediary web scripting tracking component coupled to the common data store, the load balancing component and each enterprise server of the plurality of enterprise servers, wherein the intermediary web scripting tracking component includes programming code that when executed by a processor is operable to:
      receive an indication that the web browsing session has been initiated by an enterprise server of the plurality of enterprise servers, wherein the received indication includes a web browsing session identifier of the web browsing session initiated by the enterprise server and an identifier of the enterprise server executing the web browsing session;
      generate a record in the common data store based on the received indication;
      store the web browsing session identifier and the identifier of the enterprise server executing the web browsing session in the record in the common data store;
      receive, from the load balancing component, a second indication that a request for additional information related to the web browsing session has been sent to the client device, wherein the second indication of the request for the additional information includes the web browsing session identifier and the identifier of the enterprise server executing the web browsing session;

store a request identifier and a class of the additional information in the common data store in association with the web browsing session identifier;

receive a message indicating that a request response related to the request for the additional information has been received from the client device, wherein the message includes the request identifier;

locate the request identifier, the web browsing session identifier and the identifier of the enterprise server executing the web browsing session in the common data store; and enable connection of the client device with the web browsing session executing on the enterprise server based on the web browsing session identifier and the identifier of the enterprise server executing the web browsing session associated with the located request identifier.

2. The system of claim 1, wherein the programming code of the intermediary web scripting tracking component further causes the processor to be operable to:

store a class of the additional information requested by the web browsing session in the common data store in association with the request identifier.

3. The system of claim 1, wherein the programming code of the intermediary web scripting tracking component further causes the processor when enabling connection of the client device with the web browsing session executing on the enterprise server associated with the located request identifier to be operable to:

forward the identifier of the enterprise web server to the load balancing component to enable routing of the request response to the enterprise server identified by the identifier of the enterprise server.

4. The system of claim 1, wherein the request for the additional information includes a class of the additional information requested by a server-side web script executing with the web browsing session related to the web browsing session identifier.

5. The system of claim 1, wherein the programming code of the intermediary web scripting tracking component further causes the processor to be operable to:

obtain, from each respective enterprise server of the plurality of enterprise servers, a number of web browsing sessions that are active on the plurality of enterprise servers;

compare a sum of the number of web browsing sessions that are active on the plurality of enterprise servers to a threshold value; and in response to the sum exceeding the threshold value, generating a request for additional web servers to be readied to provide available web browsing sessions.

6. The system of claim 5, wherein the programming code of the intermediary web scripting tracking component further causes the processor to be operable to:

forward the generated request for additional web sessions to a load balancing component configured to instantiate additional web sessions for use as the available web browsing sessions.

7. A method, comprising:

receiving an indication that a web browsing session has been initiated by an enterprise server, wherein the indication includes a web browsing session identifier of the web browsing session and an identifier of the enterprise server executing the web browsing session;

generating a record in a common data store;

storing the web browsing session identifier and the identifier of the enterprise server in the record;

receiving a second indication of a request for additional information related to the web browsing session has been sent to a client device, wherein the second indication of the request for the additional information related to the web browsing session includes a request identifier, a class of the additional information requested by the web browsing session, the web browsing session identifier, and the identifier of the enterprise server;

receiving a message that indicates a response request related to the request for the additional information has been received from the client device, wherein the message includes the request identifier;

using the request identifier, locating the web browsing session identifier and the identifier of the enterprise server in the common data store; and enabling connection of the client device with the web browsing session associated with the located web browsing session identifier in the common data store executing on the enterprise server identified by the identifier of the enterprise server.

8. The method of claim 7, further comprising:

obtaining from the request for the additional information, a class of the requested additional information, wherein the class of the additional information may include an alphanumeric format or a defined pattern of the requested additional information; and verifying the class of the requested additional information meets a format requirement of the requested additional information.

9. The method of claim 7, further comprising:

determining from the enterprise server that another web browsing session having another web browsing session identifier has expired; and updating a record in the common data store having the another web browsing session identifier by removing the another web browsing session identifier and any request identifier included in the record.

10. The method of claim 7, further comprising:

determining that the request for the additional information has been satisfied based on locating the web browsing session identifier and the identifier of the enterprise server in the common data store; and updating the common data store by removing the web browsing session identifier.

11. The method of claim 7, further comprising:

obtaining, from each respective enterprise server of a plurality of enterprise servers, a number of web browsing sessions that are active on each respective enterprise server;

comparing a sum of the number of web browsing sessions that are active on the plurality of enterprise servers to a threshold value; and in response to the sum exceeding the threshold value, generating a request for additional web servers to be readied to provide available web browsing sessions.

12. The method of claim 7, further comprising:

forwarding the generated request for additional web sessions to a load balancing component configured to instantiate additional web sessions for use as available web browsing sessions.

13. The method of claim 7, further comprising:

receiving, from a load balancing component, an indication of a new request for additional information related to a new web browsing session, wherein the new request includes a new web browsing session identifier providing the identifier of the server that initiated the new web browsing session to the load balancing component to respond to the message related to the new request for the additional information.

14. A non-transitory computer readable medium embodied with programming instructions when executed by a processor that causes the processor to:

receive an indication that a web browsing session has been initiated by an enterprise server, wherein the indication includes a web browsing session identifier of the web browsing session and an identifier of the enterprise server executing the web browsing session;

generate a record in a common data store;

store the web browsing session identifier and the identifier of the enterprise server in the record;

receive an indication of a request for additional information related to the web browsing session has been sent to a client device, wherein the indication of the request for the additional information related to the web browsing session includes a request identifier, a class of the additional information requested by the web browsing session, the web browsing session identifier, and the identifier of the enterprise server;

receive a message that indicates a response request related to the request for the additional information has been received from the client device, wherein the message includes the request identifier;

using the request identifier, locate the web browsing session identifier and the identifier of the enterprise server in the common data store; and enable connection of the client device with the web browsing session associated with the located web browsing session identifier in the common data store executing on the enterprise server identified by the identifier of the enterprise server.

15. The non-transitory computer readable medium of claim 14, wherein the embodied programming instructions when executed by the processor cause the processor, when locating the enterprise server to:

obtain from the request for the additional information, a class of the requested additional information, wherein the class of the additional information may include an alphanumeric format or a defined pattern of the requested additional information; and verify the class of the requested additional information meets a format requirement of the requested additional information.

16. The non-transitory computer readable medium of claim 14, wherein the embodied programming instructions when executed by the processor cause the processor, when locating the enterprise server to:

determine from the enterprise server that another web browsing session having another web browsing session identifier has expired; and update a record in the common data store having the another web browsing session identifier by removing the another web browsing session identifier and any request identifier included in the record.

17. The non-transitory computer readable medium of claim 14, wherein the embodied programming instructions when executed by the processor cause the processor, when obtaining the request identifier, to:

determine that the request for the additional information has been satisfied based on locating the web browsing session identifier and the identifier of the enterprise server in the common data store; and update the common data store by removing the web browsing session identifier.

18. The non-transitory computer readable medium of claim 14, wherein the embodied programming instructions when executed by the processor cause the processor to further:

obtain, from each respective enterprise server of a plurality of enterprise servers, a number of web browsing sessions that are active on each respective enterprise server;

compare a sum of the number of web browsing sessions that are active on the plurality of enterprise servers to a threshold value; and in response to the sum exceeding the threshold value, generate a request for additional web servers to be readied to provide available web browsing sessions.

19. The non-transitory computer readable medium of claim 14, wherein the embodied programming instructions when executed by the processor cause the processor to further:

forward the generated request for additional web sessions to a load balancing component configured to instantiate additional web sessions for use as available web browsing sessions.

20. The non-transitory computer readable medium of claim 14, wherein the embodied programming instructions when executed by the processor cause the processor to further:

receive, from a load balancing component, an indication of a new request for additional information related to a new web browsing session, wherein the new request includes a new web browsing session identifier providing the identifier of the server that initiated the new web browsing session to the load balancing component to respond to the message related to the new request for the additional information.

* * * * *